United States Patent
Yetukuri et al.

(10) Patent No.: US 8,126,617 B2
(45) Date of Patent: Feb. 28, 2012

(54) FOLDING HEAD RESTRAINT ASSEMBLY FOR CONVERTIBLE VEHICLE

(75) Inventors: Arjun Yetukuri, Rochester Hills, MI (US); Michael P. Modreski, Wixom, MI (US); Joseph Douglas Rusin, Macomb, MI (US)

(73) Assignee: Lear Corporation, Southfield, MI (US)

( * ) Notice: Subject to any disclaimer, the term of this patent is extended or adjusted under 35 U.S.C. 154(b) by 557 days.

(21) Appl. No.: 12/351,958

(22) Filed: Jan. 12, 2009

(65) Prior Publication Data

US 2010/0179728 A1 Jul. 15, 2010

(51) Int. Cl.
*B60N 2/00* (2006.01)

(52) U.S. Cl. ............................... 701/49; 280/735

(58) Field of Classification Search ............ 701/45, 701/49; 280/735, 730.1, 730.2; 180/268, 180/270; 297/216.12, 395, 391, 393; 296/63, 296/68.1, 108; 318/101–103, 264–266, 434, 318/445, 466–470, 626
See application file for complete search history.

(56) References Cited

U.S. PATENT DOCUMENTS

| | | | | |
|---|---|---|---|---|
| 4,725,076 | A | * | 2/1988 | Taylor .......................... 280/808 |
| 5,749,617 | A | * | 5/1998 | Weissrich et al. ........ 296/107.19 |
| 6,074,011 | A | | 6/2000 | Ptak et al. |
| 6,199,900 | B1 | * | 3/2001 | Zeigler .......................... 280/735 |
| 7,048,337 | B2 | | 5/2006 | Steinle et al. |
| 7,172,254 | B2 | | 2/2007 | Steinle et al. |
| 7,637,553 | B2 | * | 12/2009 | Condon et al. ................... 296/63 |
| 7,976,092 | B2 | * | 7/2011 | Meredith et al. ................ 296/63 |
| 2001/0002764 | A1 | | 6/2001 | Fischer et al. |
| 2007/0284929 | A1 | | 12/2007 | Keller et al. |
| 2008/0203801 | A1 | | 8/2008 | Jammalamadaka et al. |

FOREIGN PATENT DOCUMENTS

| | | |
|---|---|---|
| DE | 112006001302 T5 | 4/2008 |
| WO | 2007000564 A1 | 1/2007 |

OTHER PUBLICATIONS

German Office Action for corresponding Application No. 10 2009 046 535.9, mailed Oct. 13, 2010, 4 pages.

* cited by examiner

*Primary Examiner* — Dalena Tran
(74) *Attorney, Agent, or Firm* — Brooks Kushman P.C.

(57) ABSTRACT

A vehicle head restraint assembly is provided with a folding head restraint mechanism for pivoting a head restraint between use and folded positions. A head restraint is mounted to the folding head restraint mechanism. A controller for a convertible roof may be provided in electrical communication with the folding head restraint mechanism and configured for electrical communication with the convertible roof. The controller has computer executable instructions for producing a first output to actuate the convertible roof and for producing a second output to actuate the folding head restraint mechanism. An actuator may be provided and connected to the folding head restraint mechanism and to the convertible roof. The actuator has a first output to actuate the folding head restraint mechanism and a second output to actuate the convertible roof of the vehicle. A method for actuating a convertible roof and a folding head restraint assembly is provided.

20 Claims, 2 Drawing Sheets

FOLDING HEAD RESTRAINT ASSEMBLY FOR CONVERTIBLE VEHICLE

BACKGROUND

1. Technical Field

Multiple embodiments relate to folding head restraint assemblies for convertible vehicles.

2. Background Art

Vehicle seats are often provided with moveable head restraints, which can move to accommodate a head of an occupant and/or can move to various stowed positions to decrease the size of the vehicle seats. One example of a vehicle seat having a movable head restraint is disclosed in U.S. Pat. No. 7,044,555 B2, which issued on May 15, 2006 to Saberan.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
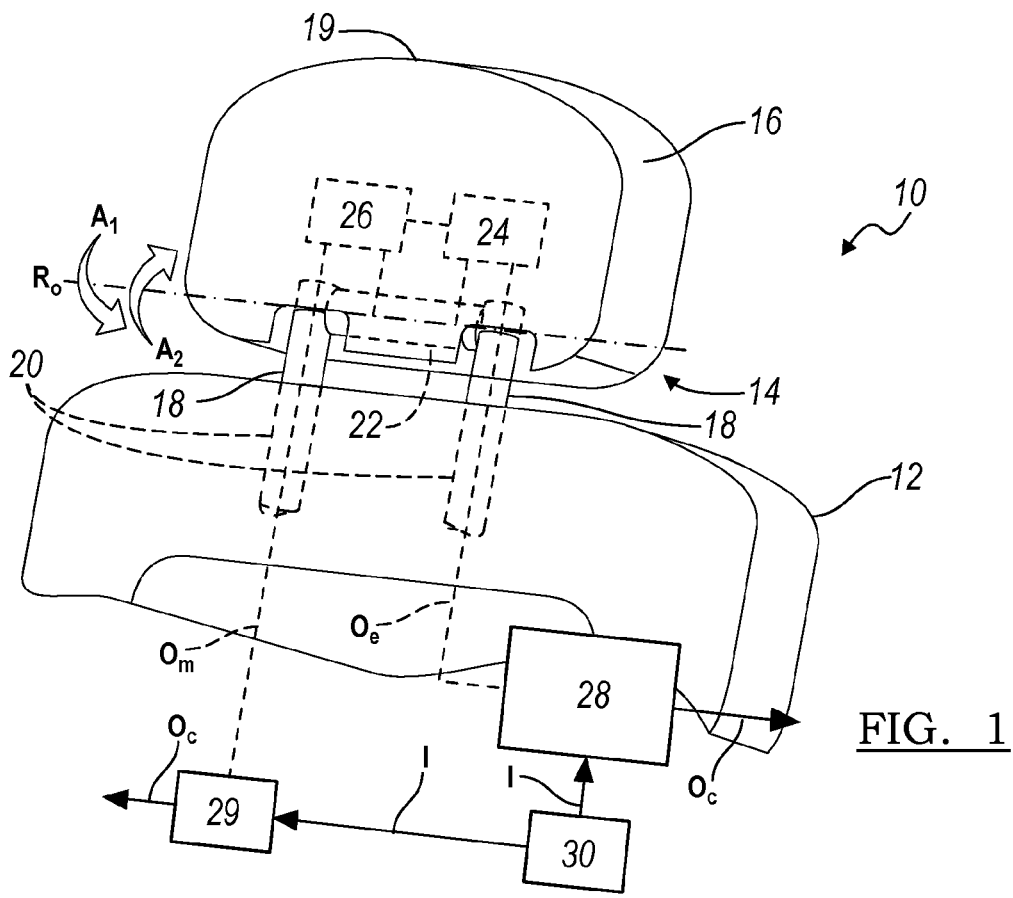
FIG. 1 is a perspective view of an embodiment of a vehicle seat having a folding head restraint assembly for a convertible vehicle in a use position.
Figure 2:
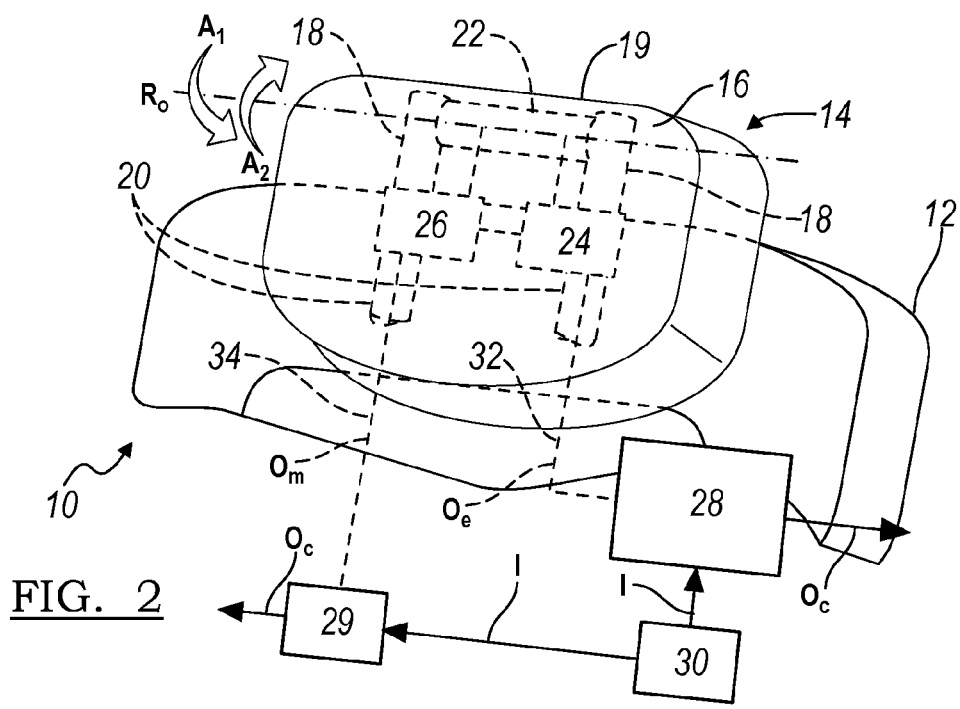
FIG. 2 is a perspective view of the vehicle seat having a folding head restraint assembly of FIG. 1 in a folded position.

Referring to FIGS. 1-2, a vehicle seat is illustrated and referenced generally by numeral 10 for use in a convertible vehicle, such as a convertible automobile or a convertible boat. Convertible vehicles include, but are not limited to, vehicles in which a retracting roof, known as a convertible roof, is moveable between a use position, covering an interior of the vehicle, and a stowed position, exposing the interior of the vehicle. In one embodiment, the convertible roof forms a portion of the vehicle roof. In another embodiment, the convertible roof forms an entire vehicle roof. Of course, any suitable convertible vehicle, having a convertible roof that is known in the art, is contemplated within the scope of the disclosed embodiments.

The vehicle seat 10 may include a seat bottom secured to a floor of an associated vehicle for seating an occupant upon the seat bottom. A seat back 12 extends from the seat bottom and is secured relative to the seat bottom for supporting a back of the occupant against the seat back 12. In at least one embodiment, the seat back 12 spans across a second row of seating of the convertible vehicle to provide support for multiple occupants. In at least one embodiment, the seat back 12 pivots relative to the seat bottom to permit access to a truck of the convertible vehicle and/or to permit an occupant to select a comfortable riding position while sitting in the vehicle seat 10.

In the depicted embodiments, the vehicle seat 10 includes a folding head restraint assembly 14. Currently, head restraint assemblies are more commonly being included in and/or on second rows of vehicle seats. When implementing a head restraint assembly 14 in the second row of seating within the convertible vehicle, additional concerns are created because of the movement of the roof of the convertible between the use position and the stowed position. At least one additional concern created by implementing the head restraint assembly 14 within the second row of the convertible vehicle is interference of the head restraint assembly 14 with movement of the convertible roof. To alleviate interference of the head restraint assembly 14 when the folding head restraint assembly 14 in the second row of the convertible vehicle, the folding head restraint assembly 14 may be automatically folded in connection with retracting the roof of the convertible vehicle. Folding the head restraint assembly 14 before or during movement of the convertible roof reduces the potential interference between the head restraint assembly 14 and the roof of the convertible vehicle. Additionally, providing a folding head restraint assembly 14 reduces work for the occupant because the occupant does not have to lower and/or remove the head restraint assembly 14 before opening the convertible roof.

As illustrated in FIG. 1, the folding head restraint assembly 14 is in a use position. The folding head restraint assembly 14 may fold about an axis of rotation $R_o$ in a first direction indicated by an arrow $A_1$ or in a second direction indicated by an arrow $A_2$. Of course, any suitable axis of rotation $R_o$ is contemplated within the scope of the disclosed embodiments. As illustrated in FIG. 2, the folding head restraint assembly 14 has a folded position. In the folded position, the head restraint assembly 14 has rotated about the axis $R_o$ in the direction indicated by arrow $A_1$ so that the head restraint assembly 14 is stowed. The folding head restraint assembly 14 may return to the use position by moving in the direction indicated by arrow $A_2$. In at least one embodiment, the folded position of the head restraint assembly 14 depicted in FIG. 2 corresponds with the stowed position of the convertible roof that is known in the art.

The folding head restraint assembly 14 reduces height of the head restraint assembly 14 relative to the seat back 12 between the use position and the folded position. The folding head restraint assembly 14 may move in fore and/or aft directions along with an upright direction relative to the seat back 12 rather than only the upright direction. The head restraint assembly 14 may be any suitable head restraint assembly 14 that reduces height of the head restraint assembly 14 relative to the seat back 12 between the use position and the folded position by moving the head restraint assembly 14 in the fore and/or aft directions along with the upright direction relative to the seat back 12.

In at least one embodiment, illustrated in FIGS. 1-2, approximately one hundred-eighty degrees are between the use position and the folded position. In another embodiment, the head restraint 16 pivots at least ninety degrees between the use position and the folded position. In yet another embodiment, the head restraint 16 pivots at least sixty degrees between the use position and the folded position. Of course, the folding head restraint assembly 14 may have any range of motion between the use position and the folded position. One non-limiting example of the folding head restraint assembly 14 is described in U.S. Patent Application Publication No. 2008/0203801, which was filed on Feb. 28, 2007 by Jammalamadaka et al. and is incorporated in its entirety herein.

As illustrated in FIGS. 1-2, the folding head restraint assembly 14 is supported by the seat back 12. The head restraint assembly 14 can be separately mounted to the seat back 12 or can be integrated with the seat back 12 in any suitable manner while allowing the head restraint assembly 14 to fold between at least the use position and the folded position. In at least one embodiment, the head restraint assembly 14 can be moved vertically relative to the seat back 12 for height adjustment. In another embodiment, the head restraint assembly 14 is mounted to a rear shelf for a second row of seating of the vehicle interior. In another embodiment, the head restraint assembly 14 is mounted on a frame of the vehicle.

In the depicted embodiment, the head restraint assembly 14 has a folding head restraint 16 supported by head restraint posts 18. The head restraint 16 may have cushioning and/or trim 19 mounted thereon. The head restraint assembly 14 need not be directly mounted to the seat back 12 and may be mounted indirectly to the seat back 12 in any suitable manner, such as via a secondary frame or support. Alternatively, the head restraint assembly 14 can be mounted directly to the vehicle body. Of course, any suitable mounting for the head restraint assembly 14 is contemplated within the scope of the disclosed embodiments.

The head restraint posts 18 may be constructed from a single metal tube or rod bent to resemble the shape shown in FIGS. 1-2. As illustrated, the head restraint posts 18 include a pair of substantially parallel, upright portions 20 interconnected by a substantially horizontally oriented crossbar portion 22. In at least one embodiment, the upright portions 20 are integrally formed with the crossbar portion 22. In another embodiment, the upright portions 20 are separately formed from the crossbar portion 22 and are joined together in a suitable manner. In at least one embodiment, the head restraint posts 18 are formed from only the crossbar portion 22 and are mounted within the vehicle frame of the convertible vehicle rather than to the seat back 12. Of course, any suitable head restraint posts 18 are contemplated within the scope of the disclosed embodiments.

The folding head restraint assembly 14 may include a folding head restraint mechanism, which can be an electrical folding head restraint mechanism 24 and/or a mechanical folding head restraint mechanism 26. Although an electrical folding head restraint mechanism 24 and a mechanical folding head restraint mechanism 26 are described herein as examples, any suitable folding head restraint mechanism 24, 26 is contemplated within the scope of the disclosed embodiments. The electrical folding head restraint mechanism 24 and/or the mechanical folding head restraint mechanism 26 can be mounted within the head restraint 16. Both the electrical folding head restraint mechanism 24 and the mechanical folding head restraint mechanism 26 can individually each fold the head restraint 16 from the use position, illustrated in FIG. 1, to the folded position, illustrated in FIG. 2.

In one embodiment, the electrical folding head restraint mechanism is a motor 24 to power the head restraint 16 to move between the use position and the folded position. In another embodiment, the electrical folding head restraint mechanism is a solenoid 24 to move the head restraint 16 to move between the use position and the folded position. Of course, any suitable electrical folding head restraint mechanism 24 is contemplated within the scope of the disclosed embodiments.

In at least one embodiment, the mechanical folding head restraint mechanism 26 includes a latch and at least one biasing member to allow the head restraint 16 to move between the use position, illustrated in FIG. 1, and the folded position, illustrated in FIG. 2. In another embodiment, the mechanical folding head restraint mechanism 26 includes a linkage to fold the head restraint 16 between the use position and the folded position. Of course, any suitable mechanical folding head restraint mechanism 26 is contemplated within the scope of the disclosed embodiments.

In the depicted embodiment, the electrical folding head restraint mechanism 24 is connected to a controller 28 and the mechanical folding head restraint mechanism 26 is connected to an actuator 29. In one embodiment, the controller 28 controls retraction of the convertible roof of the vehicle. In another embodiment, the actuator 29 controls retraction of the convertible roof of the vehicle. Both the controller 28 and the actuator 29 are provided within the vehicle and may be spaced apart from the vehicle seat 10.

In at least one embodiment, each of the controller 28 and actuator 29 has an input I. The input I may be received when an occupant actuates an actuator 30, such as a switch, to retract the convertible roof. The convertible roof may be retracted in any suitable manner. The input I may be an electrical input when sent to the controller 28 or a mechanical input when sent to the actuator 29. When the controller 28 or the actuator 29 receives the input I, the controller 28 or the actuator 29 produces a first output signal $O_C$ to the convertible roof to actuate the convertible roof. The first output signal $O_C$ may be electrical or mechanical. Of course, any suitable output signal $O_C$ is contemplated within the scope of the disclosed embodiments.

In one embodiment, the controller 28 has computer executable instructions to provide a second output signal $O_E$ to the electrical folding head restraint mechanism 24, which may also be in response to the input I to retract the convertible roof. The output signal $O_E$ to the electrical folding head restraint mechanism 24 may be an electronic output signal $O_E$ that can be transmitted in a wire 32 provided between the convertible roof retracting controller 28 and the electrical folding head restraint mechanism 24. Of course, any suitable output signal $O_E$ is contemplated within the scope of the disclosed embodiments.

In another embodiment, the actuator 29 provides a second output signal $O_M$ to the mechanical folding head restraint mechanism 26. The output signal $O_M$ to the mechanical folding head restraint mechanism 26 may be a mechanical output signal $O_M$. In one non-limiting example, the mechanical output signal $O_M$ is a cable member 32 provided between the convertible roof retracting controller 28 and the folding head restraint mechanism 26 such that the cable member 34 moves in a direction to mechanically actuate the mechanical folding head restraint mechanism 26. Of course, any suitable output signal $O_M$ is contemplated within the scope of the disclosed embodiments.

Figure 3:
FIG. 3 is a flowchart illustrating at least a portion of an embodiment of a method of operating the folding head restraint assembly of FIG. 1.

Referring now to FIG. 3, a flowchart is depicted with at least a portion of an embodiment of a method of operating the folding head restraint assembly of FIG. 1. A convertible roof is actuated by the controller in a step within box 36. In at least one embodiment, the convertible roof is actuated by an output of computer executable instructions. As discussed above, any suitable actuation of the convertible roof is contemplated within the scope of the disclosed embodiments. The controller may send a signal to the head restraint folding mechanism, as seen in a step within box 38. The signal sent in box 38 may be produced through computer executable instructions. Of course, any suitable signal can be sent through the actuation of the convertible roof to the head restraint folding mechanism. The signal sent in box 38 may be concurrently sent with convertible roof actuation of step 36. In another embodiment, signal sent in box 38 is time delayed a predetermined amount of time after the convertible roof actuation of step 36. In yet another embodiment, the signal is sent to the head restraint folding mechanism in step 38 before the convertible roof is actuated in step 36. The head restraint folding mechanism may then be actuated, in a step within box 40, which can fold the head restraint, in a suitable manner as discussed above. Folding the head restraint while actuating the convertible roof, minimizes potential interference between the head restraint and the convertible roof. Additionally, work for the occupant is reduced because the occupant only needs to actuate a single actuator to retract the convertible roof and fold the head restraint.

Figure 4:
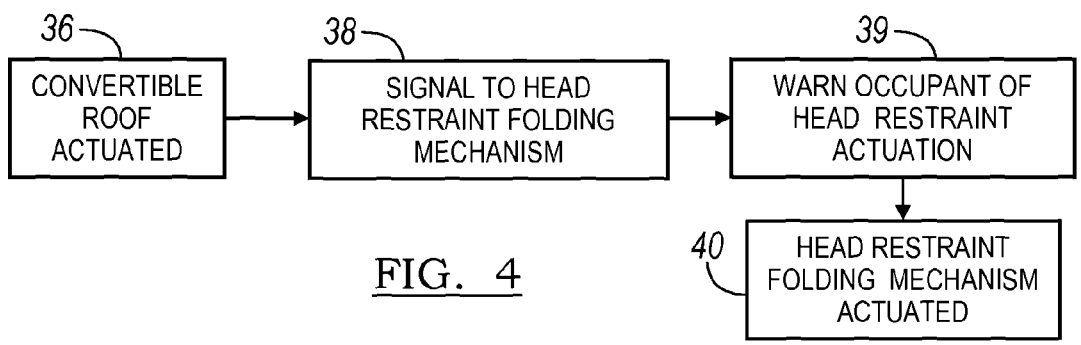
FIG. 4 is a flowchart illustrating at least a portion of another embodiment of a method of operating the folding head restraint assembly of FIG. 1.

In FIG. 4, the convertible roof is actuated by the controller in the step within box 36 and the controller sends the signal to the head restraint folding mechanism in the step within box 38, as discussed above. The controller may warn the occupant of head restraint actuation in a step within box 39. In at least one embodiment, the controller has computer executable instructions to produce the warning. The warning may occur upon receipt of the signal sent to the head restraint folding mechanism or may be time delayed a predetermined amount of time. Any suitable warning to the occupant may be employed. Examples of warnings include but are not limited to providing a light signal on or proximate a vehicle dashboard of head restraint and providing an audio signal. The head restraint folding mechanism is actuated, in the step within box 40, which may fold the head restraint.

Figure 5:
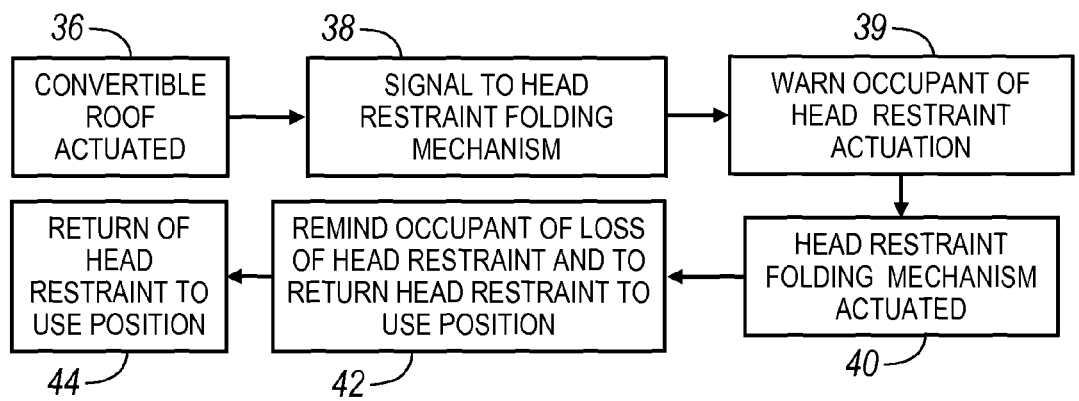
FIG. 5 is a flowchart illustrating at least a portion of another embodiment of a method of operating the folding head restraint assembly of FIG. 1.

In FIG. 5, the convertible roof is actuated in the step within box 36 and the signal is sent to the head restraint folding mechanism in the step within box 38. The occupant is warned of head restraint actuation in the step within box 39. The head restraint folding mechanism is actuated, in the step within box 40, which may fold the head restraint. The occupant is reminded through a warning of the loss of head restraint in a step within box 42. In at least one embodiment, the controller has computer executable instructions to produce the warning. The loss of the head restraint is due to the folding of the head restraint by the actuation of the head restraint folding mechanism from the step in box 40. The occupant may also be reminded by a warning to return the head restraint to the use position in a step within box 42 by computer executable instructions. Examples of warnings include but are not limited to providing a light signal on or proximate a vehicle dashboard and providing an audio signal. Of course, any suitable warning is contemplated within the scope of the disclosed embodiments. The head restraint is then returned to the use position in a step within box 44.

Figure 6:
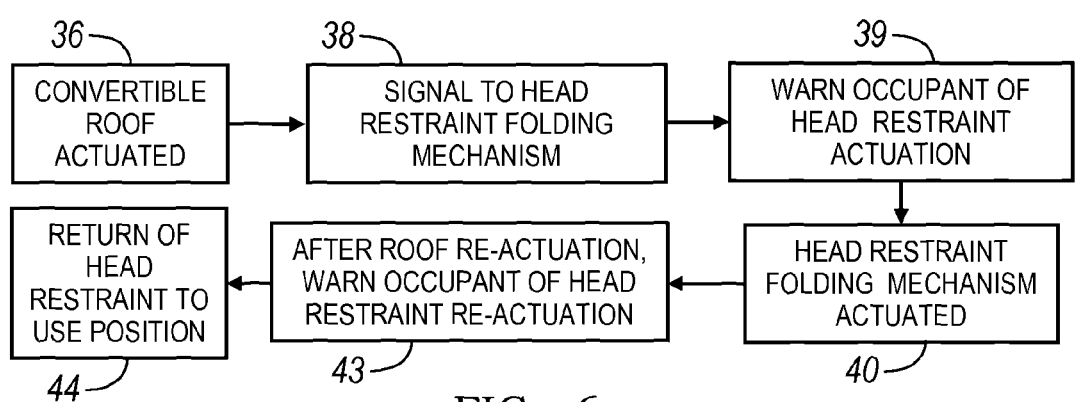
FIG. 6 is a flowchart illustrating at least a portion of yet another embodiment of a method of operating the folding head restraint assembly of FIG. 1.

In FIG. 6, the convertible roof is actuated in the step within box 36 and the signal is sent to the head restraint folding mechanism in the step within box 38. The occupant is warned of head restraint actuation in the step within box 39. The head restraint folding mechanism is actuated, in the step within box 40, which may fold the head restraint. The occupant is reminded of re-actuation of the folding of the head restraint when the convertible roof is re-actuated to return the convertible roof to an extended position in a step within box 43. The reminder may be produced by the computer executable instructions of the controller. Examples of reminders for the occupant include but are not limited to providing a light signal on or proximate a vehicle dashboard and providing an audio signal. Of course, any suitable reminder is contemplated within the scope of the disclosed embodiments. The head restraint is then returned to the use position in the step within box 44.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle head restraint assembly comprising:
a folding head restraint mechanism mounted to a vehicle seat back for pivoting a head restraint between a use position and a folded position;
a head restraint mounted to the folding head restraint mechanism; and
a controller for a convertible roof in electrical communication with the folding head restraint mechanism and configured for electrical communication with the convertible roof, the controller having computer executable instructions for:
producing a first output to actuate the convertible roof of the vehicle, and
producing a second output to actuate the folding head restraint mechanism.

2. The vehicle head restraint assembly of claim 1 wherein the computer executable instructions of the controller further comprise:
producing a warning signal upon actuation of the head restraint mechanism.

3. The vehicle head restraint assembly of claim 1 wherein the computer executable instructions of the controller further comprise:
producing a warning signal while producing the first output.

4. The vehicle head restraint assembly of claim 1 wherein the computer executable instructions of the controller further comprise:
producing a warning signal a predetermined time after producing the second output.

5. The vehicle head restraint assembly of claim 1 wherein the computer executable instructions of the controller further comprise:
receiving a signal from a switch producing the signal.

6. The vehicle head restraint assembly of claim 1 further comprising a support rod mounted to the head restraint, the support rod having a lateral portion such that the head restraint pivots between the use position and the folded position about the lateral portion.

7. A vehicle seat comprising:
a seat back adapted to be mounted within the vehicle;
the vehicle head restraint assembly of claim 6 such that the support rod is supported by the seat back within the vehicle.

8. A vehicle head restraint assembly comprising:
a folding head restraint mechanism mounted to a vehicle seat back for pivoting a head restraint between a use position and a folded position;
a head restraint mounted to the folding head restraint mechanism; and
an actuator connected to the folding head restraint mechanism and connected to the convertible roof, the actuator having a first output to actuate the folding head restraint mechanism and a second output to actuate the convertible roof of the vehicle.

9. The vehicle head restraint assembly of claim 8 wherein the first output further comprises a cable member provided between the actuator and the folding head restraint mechanism.

10. The vehicle head restraint assembly of claim 8 further comprising a support rod mounted to the head restraint, the support rod having a lateral portion such that the head restraint pivots between the use position and the folded position about the lateral portion.

11. A vehicle seat comprising:
   a seat back adapted to be mounted within the vehicle;
   the vehicle head restraint assembly of claim 10 such that the support rod is supported by the seat back within the vehicle.

12. A method for actuating a convertible vehicle roof and a folding head restraint assembly, the method comprising:
   providing a folding head restraint mechanism mounted to a vehicle seat back for pivoting a head restraint between a use position and a folded position;
   providing a head restraint mounted to the folding head restraint mechanism;
   providing a controller connected to a convertible roof for a vehicle and connected to the folding head restraint mechanism;
   producing a first output from the controller to actuate the convertible roof;
   producing a second output from the convertible roof folding controller to actuate the head restraint mechanism in response to the input; and
   folding the head restraint to a folded position in response to the actuation of the head restraint mechanism.

13. The method of claim 12 further comprising producing a warning upon actuation of the head restraint mechanism.

14. The method of claim 12 further comprising returning the head restraint to a use position.

15. The method of claim 12 further comprising producing a warning when folding the head restraint.

16. The method of claim 12 further comprising producing a reminder after folding the head restraint.

17. The method of claim 12 further comprising producing a warning signal a predetermined time after producing the second output.

18. The method of claim 12 further comprising producing a warning when producing the first output from the convertible roof folding controller adapted to actuate a convertible roof.

19. The method of claim 18 further comprising returning the head restraint to a use position.

20. The method of claim 12 further comprising:
   providing a support rod with a lateral portion; and
   mounting the head restraint to the lateral portion of the support rod such that the head restraint pivots between the use position and the folded position about the lateral portion.

* * * * *